United States Patent [19]

Clark

[11] Patent Number: 4,464,732
[45] Date of Patent: Aug. 7, 1984

[54] PRIORITIZED SORTING SYSTEM

[75] Inventor: Kim K. Clark, Anaheim, Calif.

[73] Assignee: Honeywell Inc., Minneapolis, Minn.

[21] Appl. No.: 359,730

[22] Filed: Mar. 19, 1982

[51] Int. Cl.³ .............................................. G06F 7/06
[52] U.S. Cl. ................................................. 364/900
[58] Field of Search ... 364/200 MS File, 900 MS File

[56] References Cited
U.S. PATENT DOCUMENTS

| 3,636,519 | 1/1972 | Heath | 364/900 |
|---|---|---|---|
| 4,003,031 | 1/1977 | Kashio | 364/900 |
| 4,030,077 | 6/1977 | Florence et al. | 364/900 |
| 4,037,205 | 7/1977 | Edelberg et al. | 364/900 |
| 4,052,704 | 10/1977 | Franaszek | 364/900 |
| 4,078,260 | 3/1978 | Chen et al. | 364/900 |
| 4,090,249 | 5/1978 | Chen et al. | 364/900 |
| 4,101,968 | 7/1978 | Florence | 364/900 |
| 4,110,837 | 8/1978 | Chen | 364/900 |
| 4,131,947 | 12/1978 | Armstrong | 364/900 |

*Primary Examiner*—Joseph F. Ruggiero
*Assistant Examiner*—Mark P. Watson
*Attorney, Agent, or Firm*—Trevor B. Joike

[57] ABSTRACT

A priority sorting system for sorting information on a priority basis is disclosed having at least first, second, third and fourth data stores arranged horizontally so that the input of one data store is connected to the output of the preceding data store, and a plurality of comparators, each comparator connected to a pair of data stores with no data store being connected to more than one comparator, said comparators swapping information stored in said data stores on a priority basis.

16 Claims, 12 Drawing Figures

| STEP | P | Q | R | S | T | OPERATION |
|------|---|---|---|---|---|-----------|
| 1 | L | H | L | H | L | |
| 2 | L | L | L | H | L | SHIFT RIGHT |
| 3 | L | L | H | H | L | |
| 4 | L | L | L | H | L | |
| 1 | H | H | L | H | H | |
| 2 | H | L | L | H | H | SHIFT LEFT |
| 3 | H | L | H | H | H | |
| 4 | H | L | L | H | H | |
| 1 | H | H | L | L | L | |
| 2 | H | L | L | L | L | CONDITIONAL SWAP |
| 3 | H | L | H | H | L | |
| 4 | H | L | L | H | L | |

| | SHIFT | | RIGHT | | | | | |
|---|---|---|---|---|---|---|---|---|
| 0 | K | K | L | L | M | M | N | N |
| 1 | J | K | K | L | L | M | M | N |
| 2 | J | K | K | L | L | M | M | N |
| 3 | J | J | K | K | L | L | M | M |
| 4 | J | J | K | K | L | L | M | M |

| | SHIFT | | LEFT | | | | | |
|---|---|---|---|---|---|---|---|---|
| 0 | K | K | L | L | M | M | N | N |
| 1 | L | K | M | L | N | M | Ø | N |
| 2 | L | K | M | L | N | M | Ø | N |
| 3 | L | L | M | M | N | N | Ø | Ø |
| 4 | L | L | M | M | N | N | Ø | Ø |

| | SWAP | | | | | | | |
|---|---|---|---|---|---|---|---|---|
| 0 | L | L | R | R | P | P | M | M |
| 1 | F | L | P | R | R | P | K | M |
| 2 | F | L | P | R | R | R | K | M |
| 3 | F | F | P | P | R | R | K | K |
| 4 | F | F | P | P | R | R | K | K |

FIG. 12

PRIORITIZED SORTING SYSTEM

BACKGROUND OF THE INVENTION

The present invention relates to a prioritized sorting system wherein information is read into the system, the information being sorted on a conditional swap basis during write-in and read-out such that regardless of the order in which the informaton is written into the system, the information will be read out on the basis of the predetermined priority.

Automatic sorting of information is particularly required when either a large amount of information is required to be sorted or the sorting function is associated with an automatic monitoring or control or data processing system. For example, in order to alphabetize telephone books, hundred of thousands of names are required to be alphabetically sorted. Previous methods of sorting have required large amounts of computer time or a write-to-read delay which corresponds to the length of time required for a record to propagate through the list being sorted to the properly ranked location.

The present invention, however, is not limited to merely sorting names alphabetically but it has application generally to prioritizing data. Thus, in a prioritized sorting system such as that associated with sorting alphabetically a list of names, the priority which is established for this type of sorting system is the alphabet. On the other hand, the present invention can be used as a task scheduler. Tasks which have priority value assigned to them can be done in priority sequence by loading all new task requests into the present system. Whenever a running task is completed, finding the next highest priority task is simply a matter of making a read operation from the present invention.

Previous methods of prioritizing information or data have also required large amounts of computer time spent in searching through the stored information or the use of expensive content-addressable memories.

The present system uses low cost hardware to accomplish previously expensive sorting. The present invention also takes very short times to load, read or sort.

SUMMARY OF THE INVENTION

Thus, the present invention relates to a priority sorting system for sorting information on a priority basis having a plurality of data storage elements each having at last one input for writing information therein and at least one output for reading information thereout, the data storage elements being serially connected having its output connected to a successive data storing element and its input connected to a preceding data storage element, and a conditional swapping mechanism connecting selected pairs of the data storage elements for conditionally swapping information on the prioritized basis, each data storage element being connected to only one conditional swapping mechanism.

BRIEF DESCRIPTION OF THE DRAWINGS

These and other features and advantages of the invention will beome more apparent from a detailed condiseration of the invention when taken in conjunction with the drawings in which.

DETAILED DESCRIPTION

Figure 1:
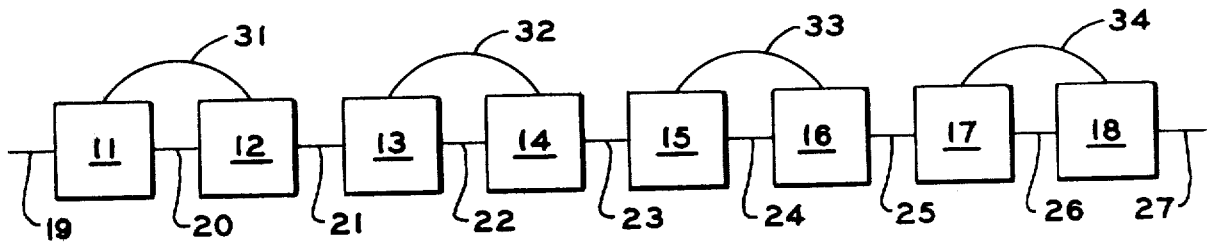
FIG. 1 shows the basic block diagram of the data element location pairs according to the present invention.

In FIG. 1, a plurality of data element locations 11–18 are serially interconnected by data transfer lines 19–27. Selected pairs of the data element locations 11–18 are connected by conditional swap lines 31–34 respectively, no data element location being connected by a corresponding conditional swap line to more than one other data element location. Thus, the number of conditional swap lines is half of the number of data element locations.

In the system shown in FIG. 1, data can be shifted to the right into data element locations 11–18 from line 19 or can be shifted to the left into data element locations 11–18 from line 27. After each data shift, a conditional swap operation is performed. As can be seen from FIG. 1, the information in data location 12 will not be swapped with the information in data location 13. Information will only be swapped between the data element locations interconnected by a conditional swap line and then only if the pairs of information to be swapped are not in the order as established by the predetermined priority basis. A concrete example will be given hereinbelow for an alphabetically sorting system wherein the letters A–G are written into the system in any random order but will be read out alphabetically.

Figure 2:
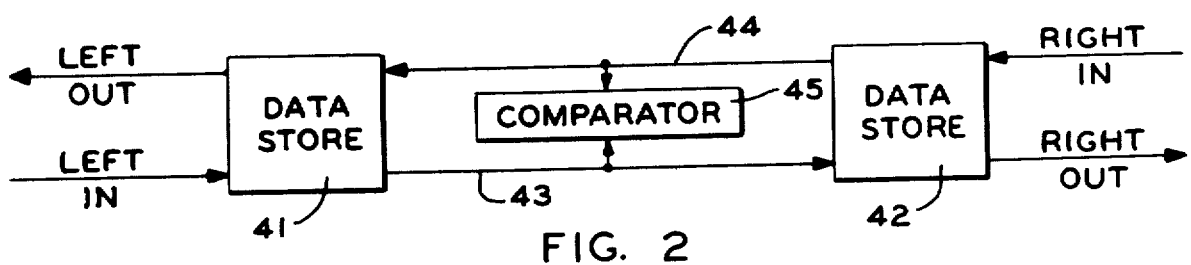
FIG. 2 shows a data element location pair in greater detail.

FIG. 2 shows a data element location pair of FIG. 1 in more detail. Thus, a data element location pair can be comprised of first data store 41 and second data store 42 each having an input and an output. Accordingly, data store 41 has an input for writing information therein from the left and an output for reading information thereout to the left. Similarly, data store 42 has an input for writing information therein from the right and an output for reading information thereout to the right. Data store 41 is connected to data store 42 by line 43 for transferring data from data store 41 to data store 42. Likewise, data store 42 is connected by line 44 to data store 41 for transferring information from data store 42 to data store 41. Comparator 45 is connected to lines 44 and 43 for comparing the data elements stored in data stores 41 and 42 and for initiating a swap of the data elements between these two data stores dependent upon the preestablished priority basis. As shown in FIG. 2, data can be written into the system as shown in FIG. 1 in either direction and data can be read out of the system in either direction provided that, in a sorting operation, data which is written in one direction must be read in the other direction.

Figure 3:
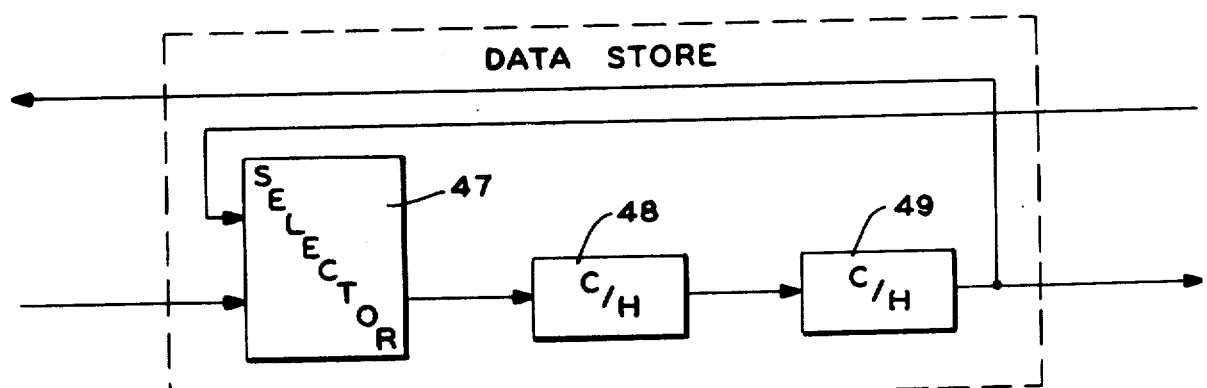
FIG. 3 shows a data store in greater detail.

A typical data store is shown in FIG. 3 and comprises selector 47 for determining the direction of data flow through the system shown in FIG. 1. The data store also comprises two capture/hold circuits 48 and 49 for capturing and holding the data on the selected input line to selector 47.

Figure 4:
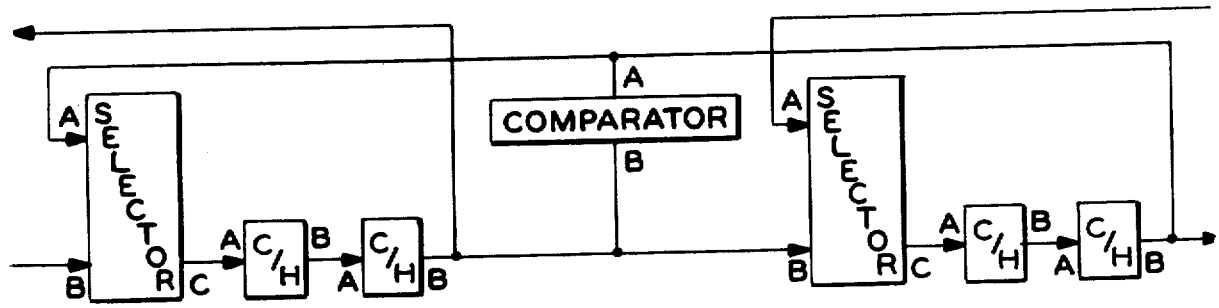
FIG. 4 shows the combination of FIGS. 2 and 3.

The system in FIG. 4 shows the FIG. 2 system with the data store blocks 41 and 42 replaced by their details as shown in FIG. 3. Letters have been used in the circuit of FIG. 4 to show the corresponding letters of the terminals for the logic diagrams of FIGS. 5–7 which correspond to the elements shown in FIG. 4.

Figure 5:
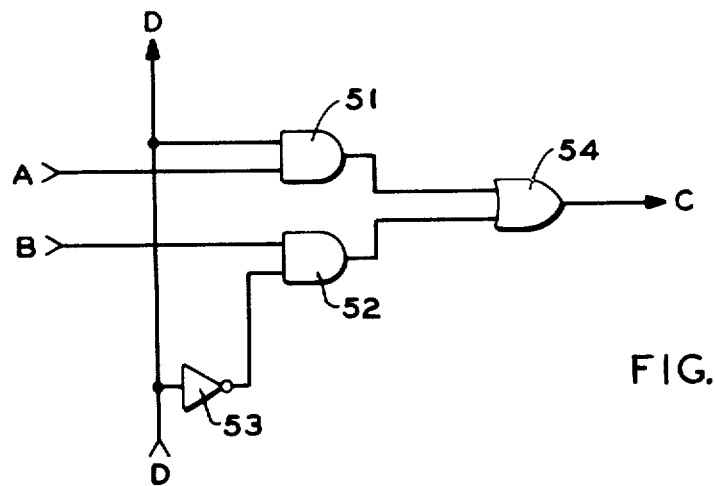
FIG. 5 shows in greater detail the selector circuit shown in FIGS. 3 and 4.

FIG. 5 shows the logic diagram for the selector circuit. Inputs A and B are connected to respective inputs of AND gates 51 and 52. The second input of AND gate 52 is connected to control line D through inverter 53 and the second input of AND gate 51 is connected directly to control line D. Control line D thus conditions AND gate 51 or AND gate 52 to pass the information on their other respective inputs to their outputs. Thus, if control line D is low, AND gate 52 is conditioned to pass the input at input B to the output of AND gate 52 and if control line D is high AND gate 51 is conditioned to pass input A to its output. The outputs of AND gates 51 and 52 are connected to the inputs of OR gate 54 so that the output of the selected AND gate is passed through to output terminal C.

Figure 6:
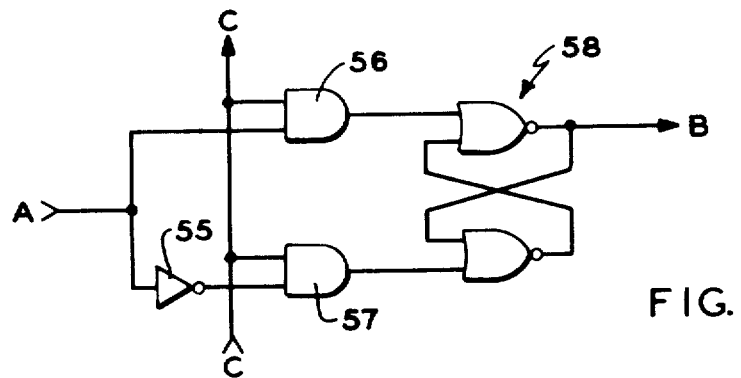
FIG. 6 shows the capture/hold circuit of FIGS. 3 and 4 in greater detail.

FIG. 6 shows the details of a capture/hold circuit. Input A is connected to either the output C from the associated selector circuit or from the output B of the preceding capture/hold circuit. Input A is connected through inverter 55 to one input of AND gate 57 and is connected directly to a first input of AND gate 56. The second inputs of AND gates 56 and 57 are connected to control line C. Thus, if control line C is low, the capture/hold circuit is not conditioned to pass the information on terminal A to terminal B and terminal B will be whatever it was before. If control line C is high, however, then the information on terminal A will operate NOR gate latch 58 to place on to output line B whatever was on input line A. Thus, if control line C is properly energized, the input from the output of the selector or from the preceding capture/hold circuit will be captured and held by latch 58.

Figure 7:
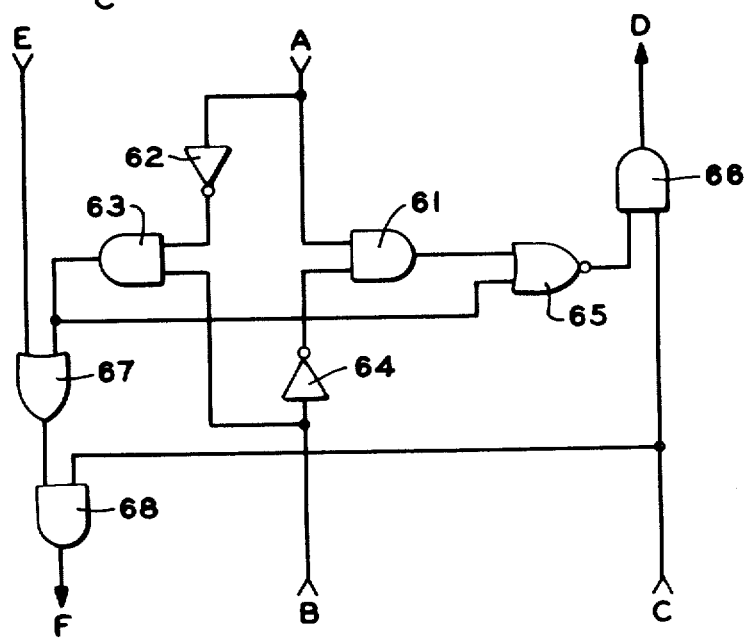
FIG. 7 shows the comparator of FIGS. 2 and 4 in greater detail.

FIG. 7 shows the comparator which compares the data stored in the two data stores attached thereto and will enable the swap of this data if the data in the data stores is not in the proper priority sequence. Thus, the right out terminal from the right hand side data store is connected to input A of the comparator and the left out output from the left hand side data store is connected to input terminal B of the comparator. Terminal A is connected directly to one input of AND gate 61 and through inverter 62 to one input of AND gate 63. Similarly, input B is connected through inverter 64 to the other input of AND gate 61 and is connected directly to the other input of AND gate 63. The outputs from AND gates 61 and 63 are connected through NOR gate 65 to a first input of AND gate 66 the other input of which is connected to control line C. The output of AND gate 66 goes to control line D. The output of AND gate 63 is also connected to one input of OR gate 67 the other input of which comes from control line E. The output of OR gate 67 is connected to one input of AND gate 68 the other input of which comes from control line C. The output of AND gate 68 goes to control line F.

Figure 8:
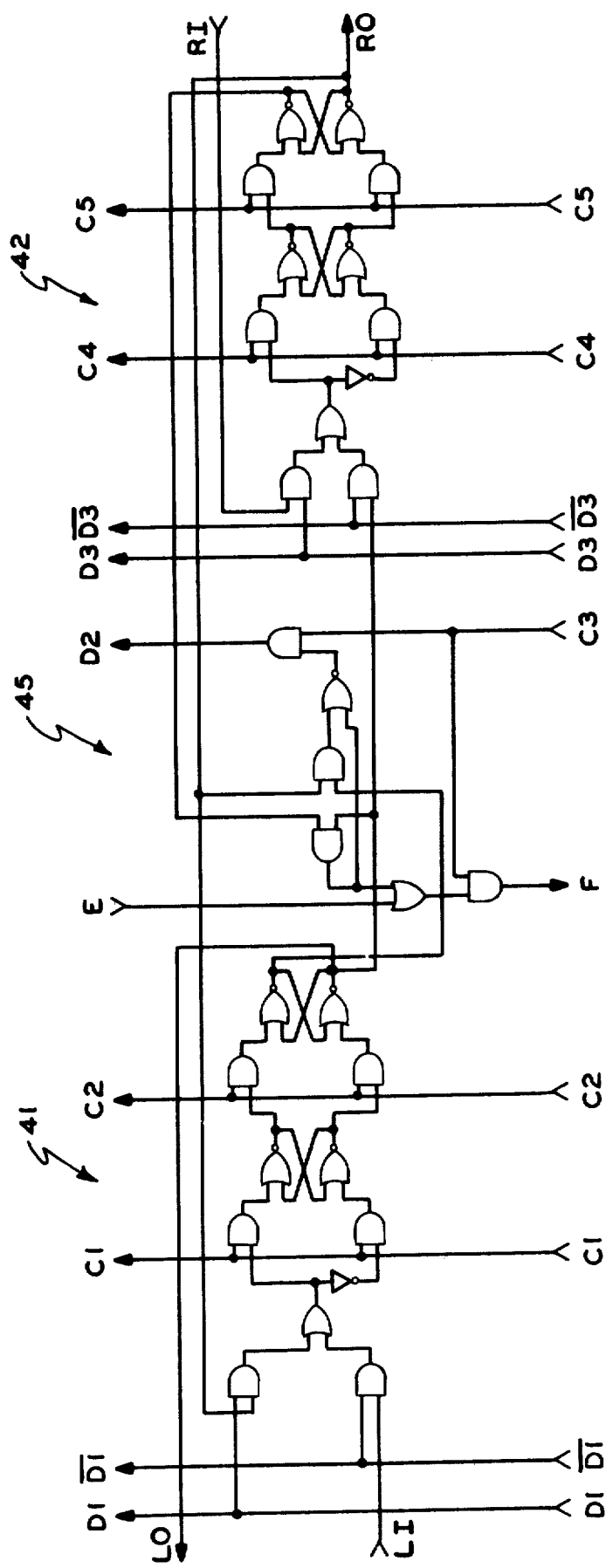
FIG. 8 shows the circuits of FIGS. 5-7 arranged as in FIG. 4.
Figure 9:
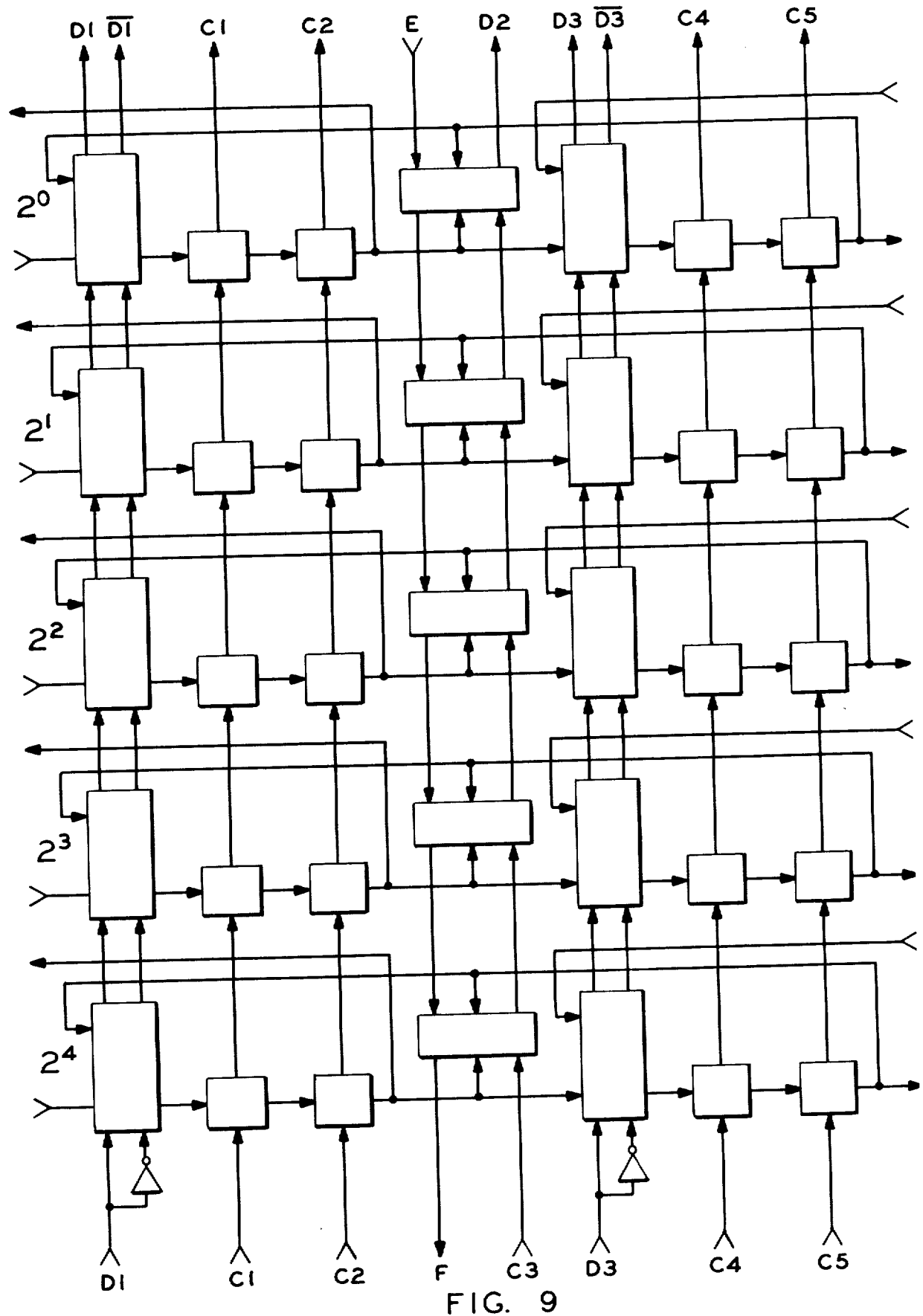
FIG. 9 shows the system of FIG. 4 arranged in rows and columns in order to sort information having a plurality of bits.

FIG. 8 shows the details of FIGS. 5–7 inserted for the boxes shown in FIG. 4 with all of the input lines and control lines. The system of FIG. 8 can handle only a one bit level of information. Thus, one bit can be stored in data store 41 and only one bit stored in data store 42. Comparator 45 can then compare the bits in 41 and 42 and direct them to be swapped if necessary. However, information which is to be sorted most often comprises more than one bit. Thus, it will be necessary to stack data stores on top of each other for the number of bits contained in the information to be sorted and side by side depending upon the number of data to be sorted. Thus, if the sorting system according to the instant invention is to sort the letters A–G, the system of FIG. 9 shows five rows of data stores having the least significant bit at the top and the most significant bit at the bottom. Thus, five levels of data stores are necessary to completely describe the 26 letters in the alphabet. Five levels can accommodate 32 different combinations; however, only 26 combinations are needed for the 26 letters in the alphabet.

There are only two data stores for any given level in FIG. 9. In order to sort eight letters, the circuit of FIG. 9 must be quadrupled horizontally. For example, the letter G in the first data store on the left will comprise the following bits from top to bottom; 0,1,1,0,0.

FIG. 9 also shows how the control lines for the various levels or rows are connected. The comparators are arranged with respect to one another so that the comparator which detects a difference between data elements at the most significant bit level will control the swap. For example, the data stored in the left hand data stores of FIG. 9 may be 0,0,1,0,0 whereas the data stored in the right hand data stores may be 0,1,0,0,0 from the $2^0$ level to the $2^4$ level. The $2^4$ level, being the most significant level, does not detect a difference and will not issue a swap. The $2^3$ comparator likewise will not issue a swap. There is a difference at the $2^2$ level and, if the predetermined priority basis dictates that lower numbers should be on the left and higher numbers should be on the right, the $2^2$ comparator will issue the swap. The $2^2$ comparator prevents the $2^1$ comparator from precluding a swap operation because the $2^2$ level is more significant. On the other hand, if the numbers are reversed, the $2^2$ comparator, detecting a difference, precludes a swap by preventing the $2^1$ comparator from issuing a swap because the more significant bits determine which number is larger.

In effect, therefore, the comparator representing the most significant bit level will look for a difference in the bit values of the data stored in the data stores to which it is connected. If there is no difference, then the most significant bit comparator over control line C3 allows the next lower significant bit comparator to see if there is a difference between the bits stored in its associated data stores and so on. If no difference is found, then data is not swapped. However, the first comparator which detects a difference analyzes the nature of this difference between the bits. If the bit value in the data stored to the left of the comparator is 0 and the bit value of the data stored to the right of the comparator is 1, no swap will be made even though there may be other differences at other lower significant bit levels.

Figures 10, 11:
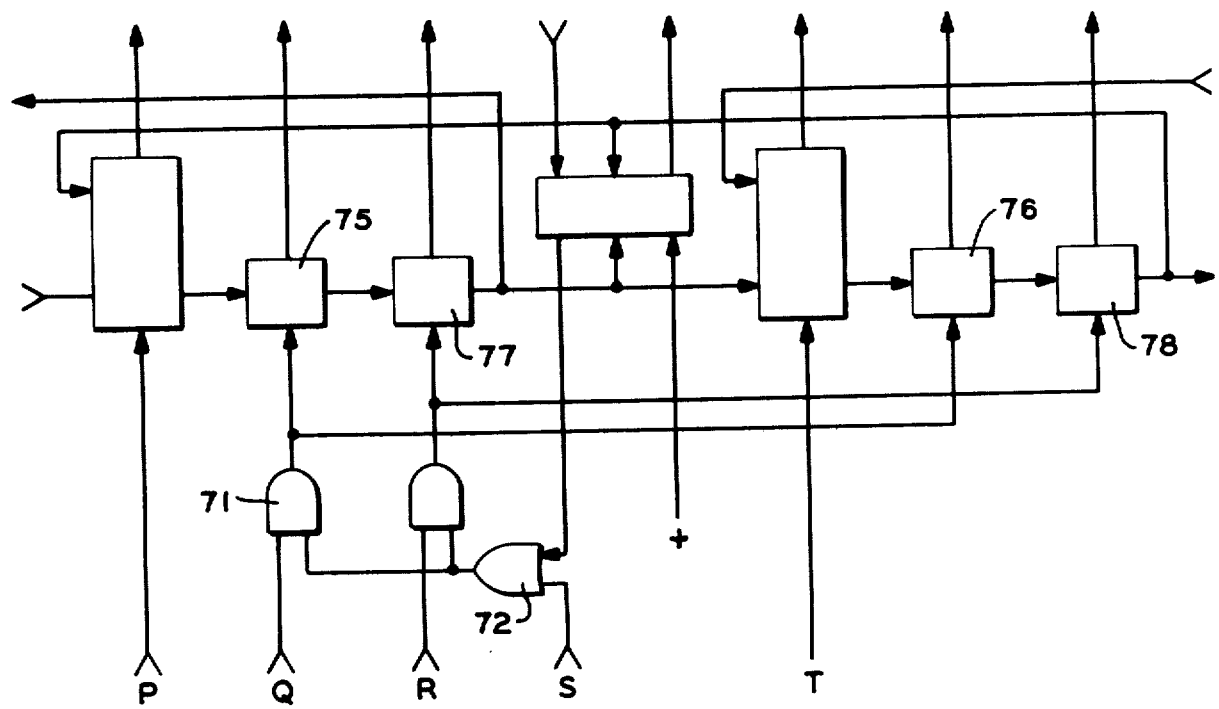
FIGS. 10 and 11 show how information can be shifted through the sorting system and conditionally swapped; and, FIG. 12 shows an example of information either shifted through the system to the right, to the left or swapped.

The relationship between comparators is seen more clearly from FIG. 7. If the left hand and right hand bits at the most significant bit level are the same, the outputs from AND gates 61 and 63 are both zero so that the output from NOR gate 65 is one. Since C is one, as shown in FIG. 10, the output D is one. Since C is one, the output F from AND gate 68 will be whatever its other input is. Output D is connected to the input C of the next comparator. All output Ds will be one if the left hand and right hand bits are the same. Thus, each comparator is set up to pass through the output of the first comparator which senses a difference.

If the comparator at the first level where there is a difference has a zero at input B and a one at input A, the output of NOR gate 65 goes to zero to disable all lesser significant comparators. At the same time, the output from AND gate 63 is zero which passes through OR gate 67 and AND gate 68 and through all more significant comparators to terminal F of the most significant comparator. Since F is 0, no swap should be made.

On the other hand, if the first difference between the left hand store and the right hand store as we go up the chain in FIG. 9 is represented by a 1 in the left hand store and a 0 in the right hand store, then B is 1 and A is 0 such that the output of AND gate 63 is a 1 and the output of AND gate 61 is a 0. The output of NOR gate 65 is a 0 making the output of AND gate 66 a 0 to disable all lesser significant comparators. Line E will, therefore, be 0 and the output of OR gate is a 1 which passes through all higher significant comparators to terminal F of the most significant comparator. Since F is 1, a swap should be made.

The swap and shifting operations are seen more clearly in FIGS. 10 and 11. FIG. 10 shows a control circuit for controlling the control lines of the most significant bit level of the stack shown in FIG. 9. During any swap operation, the input to control line D of the selector of the left hand store is high and the corresponding control line for the selector of the right hand store is low. Thus, the output from the right hand store will be connected to the output of the selector in the left hand store and the output of the left hand store will be connected go the output of the selector of the right hand store. At the first step of the swap operation, Q terminal goes high which conditions AND gate 71 to pass the output of OR gate 72 which is connected to terminal F from the output of the comparator of the most significant bit. Since this output is a 0 and since line S is a 0, the output from AND gate 71 remains low and the output from the first capture/hold circuit 75 will not change states. Thus, under the example given above, if the bit value stored in the left hand store was 0 and the bit value stored in the right hand store was 1, the output F from the comparator would be 0 and the output from the right hand store would not be placed on the output of capture/hold circuit 75 of the left hand store and the output from the left hand store would not be placed on the output of capture/hold circuit 76 of the right hand store. Thus, when input terminal R goes high, the previous value in the capture/hold circuits 75 and 76 will be placed on the outputs of capture/hold circuits 77 and 78 and no swapping will be accomplished.

On the other hand, if the bit value of the information stored in the left hand store had been 1 and the bit value of the information stored in the right hand store had been 0, the output F from the comparator would have been 1. Thus, then terminal Q is high, capture/hold circuit 75 is conditioned to capture and hold the output of the right hand store and the capture/hold circuit 76 is conditioned to capture and hold the output from the left hand store. To complete the conditional swap operation, terminal S is then maintained high and R is placed high which will allow capture/hold circuit 77 to capture and hold the output of capture/hold circuit 75 and the capture/hold circuit 78 is conditioned to capture and hold the output of capture/hold circuit 76. Thus, the information in the left and right hand stores has been exchanged or swapped.

FIG. 11 also shows how information can be shifted to the right or shifted to the left by appropriately energizing the terminalsl P-T. FIG. 12 gives an example of the data flow through the various circuits. Columns 3 and 4 represent the two capture/hold circuits on the left in FIG. 10 and columns 5 and 6 represent the two capture/hold circuits in the right data store in FIG. 10. Columns 1 and 2 repesent the capture/hold circuits in the right hand store of the previous data store not shown in FIG. 10 and columns 7 and 8 represent the information stored in the capture/hold circuits of the successive data store not shown in FIG. 10.

As discussed above, it must be remembered that during either writing or reading a swap operation must be performed after each shift operation. As shown in the example below, this sequence of events will always insure that the data is correctly sorted.

| WRITE | | 11 | 12 | 13 | 14 | 15 | 16 | 17 | 18 |
|---|---|---|---|---|---|---|---|---|---|
| START | EFGHABCD | | | | | | | | |
| SHIFT | EFGHABC | D | | | | | | | |
| SWAP | EFGHABC | D | | | | | | | |
| SHIFT | EFGHAB | C | D | | | | | | |
| SWAP | EFGHAB | C | D | | | | | | |
| SHIFT | EFGHA | B | C | D | | | | | |
| SWAP | EFGHA | B | C | D | | | | | |
| SHIFT | EFGH | A | B | C | D | | | | |
| SWAP | EFGH | A | B | C | D | | | | |
| SHIFT | EFG | H | A | B | C | D | | | |
| SWAP | EFG | A | H | B | C | D | | | |
| SHIFT | EF | G | A | H | B | C | D | | |
| SWAP | EF | A | G | B | H | C | D | | |
| SHIFT | E | F | A | G | B | H | C | D | |
| SWAP | E | A | F | B | G | C | H | D | |
| SHIFT | | E | A | F | B | G | C | H | D |
| SWAP | | A | E | B | F | C | G | D | H |

| READ | | 11 | 12 | 13 | 14 | 15 | 16 | 17 | 18 |
|---|---|---|---|---|---|---|---|---|---|
| START | | A | E | B | F | C | G | D | H |
| SHIFT | A | E | B | F | C | G | D | H | |
| SWAP | A | B | E | C | F | D | G | H | |
| SHIFT | AB | E | C | F | D | G | H | | |
| SWAP | AB | C | E | D | F | G | H | | |
| SHIFT | ABC | E | D | F | G | H | | | |
| SWAP | ABC | D | E | F | G | H | | | |
| SHIFT | ABCD | E | F | G | H | | | | |
| SWAP | ABCD | E | F | G | H | | | | |
| SHIFT | ABCDE | F | G | H | | | | | |
| SWAP | ABCDE | F | G | H | | | | | |
| SHIFT | ABCDEF | G | H | | | | | | |
| SWAP | ABCDEF | G | H | | | | | | |
| SHIFT | ABCDEFG | H | | | | | | | |
| SWAP | ABCDEFG | H | | | | | | | |
| SHIFT | ABCDEFGH | | | | | | | | |
| SWAP | ABCDEFGH | | | | | | | | |

As can be seen, the write operation is performed by inserting the letters by shifting them to the right into the data stores as shown in FIG. 1 and the read operation is performed by shifting the letters out to the left from the data store of FG. 1. The example given above for single letters requires a tier of five as shown in FIG. 9 quadrupled horizontally so that there will be a total of eight data stores having four comparators for connecting pairs of data stores such that no data store is connected to more than one comparator. In order to sort names having five letters, FIG. 9 must be quintupled vertically and must be expanded horizontally so that there are as many data stores as there are names to be sorted.

The embodiments of the invention in which an exclusive property or right is claimed are defined as follows:

1. A priority sorting system for sorting information on a priority basis, said information having priority values associated therewith, said system comprising:
    at least first, second, third and fourth data stores each having at least one input for writing information therein and at least one output for reading information thereout, said at least one output of said first data store connected to said at least one input of said second data store, said at least one output of said second data store connected to said at least one input of said third data store, and said at least one output of said third data store connected to said at least one input of said fourthh data store;
    a first comparaor connected to said first and second stores for comparing information stored in said first and second data stores and for conditionally swapping said information between said first and second data stores dependent upon said priority basis;
    a second comparator connected to said third and fourth data stores for comparing information stored in said third and fourth data stores and for conditionally swapping said information between said third and fourth data stores dependent upon said priority basis; and,
    swapping control means connected to said data stores and to said comparators for directing conditional swapping of said information between said data stores dependent upon said priority basis.

2. The system of claim 1 wherein each of said first and second comparators comprises first and second inputs, said first input of said first comparator being connected to said output of said second data store and said first input of said second comparator being connected to said output of said fourth data store, said second input of said first comparator being connected to said output of said first data store and said second input of said second comparator being connected to said output of said third data store, said swapping means having means connected to said comparators for causing information to be swapped between respective data stores when one of said first and second inputs of said comparators has a higher priority than the other of said first and second inputs of said comparators.

3. A priority sorting system for soring information on a priority basis, said information having priority values associated therewith, said system comprising:
    a first data store pair comprising a first data store and a second data store and first comparator means connected to said first and second data stores, said first comparator means for comparing information stored in said first and second data stores and for conditionally swapping said information between said first and second data stores dependent upon said priority basis, said first data store pair having a left in input, a right in input, a left out output and a right out output, said left in input and said right in input for writing information into said first and second data stores in either of two directions and said left out output and said right out output for reading out information from said first and second data stores in either direction;
    a second data pair having a third data store and a fourth data store and second comparator means connected to said third and fourth data stores, said second comparator means for comparing information stored in said third and fourth data stores and for conditionally swapping said information between said first and second data stores dependent upon said priority basis, said second data store pair having a left in input, a right in input, a left out output and a right out output, said left in input and said right in input for writing information into said third and fourth data stores in either of two directions and said left out output and said right out output for reading out information from said third and fourth data stores in either direction;
    means for connecting said right out output of said first data store pair to said left in input of said second data store pair and for connecting said right in input of said first data store pair to said left out output of said second data store pair; and,
    swapping control means connected to said data stores and to said comparator means for directing conditional swapping of said information between said data stores dependent upon said priority basis.

4. The system of claim 3 wherein each data pair comprises a first selector having a second input connected to said left in input of its associated data store pair and a first input connected to said right out output of its associated data store pair, and an output connected to an input of a first capture/hold circuit, said first capture/hold circuit having an output connected to an input of a second capture/hold circuit, said second capture/hold circuit having an output connected to said left out output of its associated data store pair and to a first input of its associated comparator and to a first input of a second selector, said second selector having a second input connected to said right in input of its associated data store pair and an output connected to a first input of a third capture/hold circuit, said third capture/hold circuit having an output connected to an input of a fourth capture/hold circuit, said fourth capture/hold circuit having an output connected to said right out output terminal and to a second input of its associated comparator and to said second input of said first selector.

5. The system of claim 4 wherein each selector comprises first and second AND gates, said first AND gate having a first input connected to the first input of said selector and said second AND gate having a first input connected to the second input of said selector, each of said AND gates having a second input connected to a control means for determining which input of said selector should be connected through said AND gates, each of said AND gates having an output connected to an input of an OR gate, said OR gate having an output which forms the output of said selector.

6. The system of claim 5 wherein each of said capture/hold circuits comprises first and second AND gates, said first AND gate having an input connected directly to said input of said capture/hold circuit and said second AND gate having a first input connected through an inverter to said input of said capture/hold circuit, each of said first and second AND gates of said capture/hold circuit having second inputs connected to a control line for determining an output of said associated capture/hold circuit, each AND gate having an output connected to a respective input of a NOR gate latch, said latch having an output forming the output of the associated capture/hold circuit.

7. The system of claim 6 wherein each of said comparators comprises a first input connected to the respective outputs of said second and fourth capture/hold circuits and a second input connected to the respective outputs of said first and third capture/hold circuits, said comparator having a first means connected to the first and second inputs of said comparator for providing a swap output when said second input of said comparator has a higher priority than said first input of said comparator.

8. The system of claim 3 further comprising
a third data store pair having a fifth data store and a sixth data store and a third comparator connected to said fifth and sixth data stores, said third comparator for comparing information stored in said fifth and sixth data stores and for conditionally directing the swapping of said information between said fifth and sixth data stores dependent upon said priority basis, said third data store pair having a left in input, a right in input, a left out output and a right out output, said left in input and said right in input for writing information into said fifth and sixth data stores in either of two directions and said left out output and said right out output for reading out information from said fifth and sixth data stores in either direction;
a fourth data pair having a seventh data store and an eighth data store and a fourth comparator connected to said seventh and eighth data stores, said fourth comparator for comparing information stored in said seventh and eighth data stores and for conditionally directing the swapping of said information between said seventh and eighth data stores dependent upon said priority basis, said fourth data store pair having a left in input, a right in input, a left out output and a right out output, said left in input and said right in input for writing information into said seventh and eighth data stores in either of two directions and said left out output and said right out output for reading out information from seventh and eighth data stores in either direction;
means for connecting said right out output of said third data store pair to said left in input of said fourth data store pair and for connecting said right in input of said third data store pair to said left out output of said fourth data store pair; and,
said third data pair being connected to said first data pair and said second data pair being connected to said fourth data pair so that the information which is stored can be comprised of at least two bits, said first and third and said second and fourth data pairs being arranged vertically such that said third data pair has lesser significance than said first data pair and said fourth data pair has lesser significance than said second data pair, and said first and second data pairs are arranged horizontally and said third and fourth data pairs are arranged horizontally.

9. The system of claim 8 wherein each of said comparators comprises first, second, third and fourth inputs and first and second outputs, said first input of each comparator being connected to said respective second, fourth, sixth and eighth data stores and said second input of each comparator being connected to said respective first, third, fifth and seventh data stores, said first output of each of said comparators being connected to said third input of each comparator having lesser significance for disabling the comparator for a data pair having lesser significance if there is a difference between the first and second inputs of the highest significant comparator which detects a difference and for enabling lesser significant comparators for data pairs if there is no difference, each of said comparators having output means being connected to said second output for providing a swap output if the second input of a comparator has a higher priority than the first input, said output means being connected to said fourth input which is connected to said second output of a next lower significant comparator so that a swap output from a lesser significant comparator can flow through all higher significant comparators if a swap operation is to be performed.

10. The system of claim 9 wherein each data pair comprises a first selector having a first input connected to said left in input of its associated data store pair and a second input connected to said right out output of its associated data store pair, and an output connected to an input of a first capture/hold circuit, said first capture/hold circuit having an output connected to an input of a second capture/hold circuit, said second cature/hold circuit having an output connected to said left out output of its associated data store pair and to a first input of its associated comparator and to a first input of a second selector, said second selector having a second input connected to said right in input of its associated data store pair and an output connected to a first input of a third capture/hold circuit, said third capture/hold circuit having an output connected to an input of a fourth capture/hold circuit, said fourth capture/hold circuit having an output connected to said right out output terminal and to a second input of its associated comparator and to said second input of said first selector, control lines of each of said selector and capture/hold circuits being connected to corresponding control lines of corresponding selectors and capture/hold circuits of the vertically arranged data pairs.

11. The system of claim 10 wherein each selector comprises first and second AND gates, said first AND gate having a first input connected to the second input of said selector and said second AND gate having a first input connected to the second input of said selector, each of said AND gates having a second input connected to a control means for determining which input of said selector should be connected through said AND gates, each of said AND gates having an output connected to an input of an OR gate, said OR gate having an output which forms the output of said selector.

12. The system of claim 11 wherein each of said capture/hold circuits comprises first and second AND gates, said first AND gate having an input connected directly to said input of said capture/hold circuit and said second AND gate having a first input connected through an inverter to said input of said capture/hold circuit, each of said first and second AND gates of said capture/hold circuit having second inputs connected to a controlline for determining an output of said associated capture/hold circuit, each AND gate having an output connected to a respective input of a dual NOR gate latch, said latch having an output forming the output of the associated capture/hold circuit.

13. The system of claim 12 wherein each of said comparators associated with each data pair comprises a first input connected to the respective outputs of said second and fourth capture/hold circuits and a second input connected to the respective outputs of the first and third capture/hold circuits, said comparator having a first means connected to the first and second inputs of said comparator for providing a swap output when said second input of said comparator has a higher priority than said first input of said comparator.

14. The method of sorting information on a priority basis comprising the steps of shifting data elements into at least first, second, third and fourth data stores one at a time, and comparing and swapping data elements between said first and second data stores and between said third and fourth data stores each time one of said data elements is shifted in to said data stores, said swapping being performed on a priority basis.

15. A priority sorting system for sorting information on a priority basis, said information having priority values associated therewith, said system comprising:
  a plurality of data store pairs each being arranged horizontally and having first and second inputs and first and second outputs, each data store pair having its second output connected to the first input of the next succeeding data store pair and its second input connected to the first output of said next succeeding data store pair, each data store pair having first and second data stores; and,
  each data store pair having a conditional swapping circuit connected to respective first and second data stores for swapping information between associated data stores on a priority basis, each data store being connected to only one conditional swapping circuit.

16. The system of claim 15 comprising additional data store pairs, said additional data store pairs being arranged vertically in columns with corresponding data store pairs of said plurality of data store pairs, each of said additional data store pairs haing first and second data stores, each of said additional data store pairs having corresponding conditional swapping circuits connected to respective first and second data stores of said additional data store pairs for swapping information between associated data stores on a priority basis, each data store being connected to only one conditional swapping circuit, said vertically arranged data store pairs being arranged from a data store pair having most significance in said priority basis to a data store pair having least significance in said priority basis, each conditional swapping circuit being vertically connected to a conditional swapping circuit of a data store pair having lesser significance, said conditional swapping circuits being arranged for detecting priority differences between information stored in their associated data stores, said conditional swapping circuits having means for enabling lesser significant conditional swapping circuits if no priority difference is detected and for disabling lesser significant conditional swapping circuits if a priority difference is detected, all conditional swapping circuits having higher significance than the disabled conditional swapping circuits being arranged to pass through a swap output if information is to be swapped.

* * * * *

UNITED STATES PATENT AND TRADEMARK OFFICE
CERTIFICATE OF CORRECTION

PATENT NO. : 4,464,732
DATED : August 7, 1984
INVENTOR(S) : Kim K. Clark

It is certified that error appears in the above-identified patent and that said Letters Patent is hereby corrected as shown below:

Column 7, line 19, delete "fourthh" and insert --fourth--.

Column 7, line 51, delete "soring" and insert --sorting--.

Column 8, line 26, delete "second" and insert --first--, line 28, delete "first" and insert --second--.

Column 12, line 5, delete "haing" and insert --having--.

Signed and Sealed this

Twenty-sixth Day of February 1985

[SEAL]

Attest:

DONALD J. QUIGG

Attesting Officer

Acting Commissioner of Patents and Trademarks